United States Patent
Vanchev

(10) Patent No.: US 10,242,559 B2
(45) Date of Patent: *Mar. 26, 2019

(54) LIMITING SERVICE AVAILABILITY WHEN SENSOR DEVICE IS NON-OPERATIONAL DUE TO NOISE FLOOR CHANGE

(71) Applicant: AT&T Digital Life, Inc., Atlanta, GA (US)

(72) Inventor: Plamen Vanchev, Suwanee, GA (US)

(73) Assignee: AT&T Digital Life, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/904,740

(22) Filed: Feb. 26, 2018

(65) Prior Publication Data

US 2018/0190105 A1 Jul. 5, 2018

Related U.S. Application Data

(63) Continuation of application No. 15/249,692, filed on Aug. 29, 2016, now Pat. No. 9,905,118.

(51) Int. Cl.
*H04W 8/18* (2009.01)
*G08B 25/14* (2006.01)
(Continued)

(52) U.S. Cl.
CPC ............ *G08B 29/02* (2013.01); *G08B 25/14* (2013.01); *G08B 29/04* (2013.01); *G08B 29/06* (2013.01);
(Continued)

(58) Field of Classification Search
CPC ... G08B 29/02; H04B 17/345; H04L 41/0659; H04W 84/18
(Continued)

(56) References Cited

U.S. PATENT DOCUMENTS 5,400,246 A 3/1995 Wilson
5,950,110 A 9/1999 Hendrickson
(Continued)

OTHER PUBLICATIONS

U.S. Office Action dated Apr. 5, 2017 in U.S. Appl. No. 15/249,692.
U.S. Notice of Allowance dated Sep. 22, 2017 in U.S. Appl. No. 15/249,692.

*Primary Examiner* — Daryl C Pope
(74) *Attorney, Agent, or Firm* — Hartman & Citrin LLC

(57) ABSTRACT

Concepts and technologies are disclosed herein for limiting service availability when a sensor device is non-operational due to a noise floor change. According to one aspect of the concepts and technologies disclosed herein, a connected home system includes a controller device configured to monitor a plurality of sensor devices deployed within a premises, and a sensor device of the plurality of sensor devices. The sensor device can monitor radio frequency ("RF") noise in a radio environment associated with the premises. The radio environment is associated with an RF noise floor. The sensor device can determine whether the radio frequency noise exceeds a noise threshold. In response to determining that the RF noise exceeds the noise threshold, the sensor device can cause the controller device to exclude the sensor device from being monitored by the controller device until the RF noise returns to below the noise threshold.

20 Claims, 8 Drawing Sheets

(51) Int. Cl.
*G08B 29/02* (2006.01)
*G08B 29/04* (2006.01)
*G08B 29/06* (2006.01)
*G08B 29/18* (2006.01)
*H04L 12/24* (2006.01)
*H04L 12/28* (2006.01)
*H04W 84/18* (2009.01)
*H04B 17/345* (2015.01)

(52) U.S. Cl.
CPC ........... *G08B 29/18* (2013.01); *H04B 17/345* (2015.01); *H04L 12/28* (2013.01); *H04L 41/0659* (2013.01); *H04W 8/186* (2013.01); *H04W 84/18* (2013.01)

(58) Field of Classification Search
USPC ............. 340/506, 3.1, 539.1, 539.11, 539.13
See application file for complete search history.

(56) References Cited

U.S. PATENT DOCUMENTS

| | | |
|---|---|---|
| 5,959,529 A | 9/1999 | Kail, IV |
| 7,386,030 B2 | 6/2008 | Asghar et al. |
| 8,175,577 B1 | 5/2012 | Harvey et al. |
| 8,238,875 B2 | 8/2012 | Badt, Jr. |
| 8,723,671 B2 | 5/2014 | Foisy et al. |
| 9,167,511 B2 | 10/2015 | Lee et al. |
| 9,271,170 B1 | 2/2016 | Loverich et al. |
| 9,905,118 B1 * | 2/2018 | Vanchev ................ G08B 29/02 |
| 2004/0005858 A1 | 1/2004 | Cervinka et al. |
| 2011/0151795 A1 | 6/2011 | D'Avello |
| 2013/0336130 A1 | 12/2013 | Kore et al. |
| 2015/0373022 A1 | 12/2015 | Dubman et al. |
| 2016/0043827 A1 | 2/2016 | Filson et al. |

* cited by examiner

LIMITING SERVICE AVAILABILITY WHEN SENSOR DEVICE IS NON-OPERATIONAL DUE TO NOISE FLOOR CHANGE

CROSS-REFERENCE TO RELATED APPLICATIONS

This application is a continuation of and claims priority to U.S. patent application Ser. No. 15/249,692, entitled "Limiting Service Availability When Sensor Device is Non-Operational Due to Noise Floor Change," filed Aug. 29, 2016, now U.S. Pat. No. 9,905,118, which is incorporated herein by reference in its entirety.

BACKGROUND

Connected homes, also known as smart homes, are homes equipped with technology that allows users to control and interact with various aspects of their home. Some aspects of the connected home include home security and automation. Home security systems can be self-monitored or professionally monitored remotely by a monitoring center. In the past, monitored security systems typically utilized landline connections to communicate with a monitoring center. In recent years, however, improvements in wireless technology to increase reliability and coverage have facilitated the deployment of wireless devices in the connected home to replace earlier landline connections, and this trend is likely to continue. Utilizing wireless technology for security systems eliminates the security vulnerability of a severed landline, but increases the system's vulnerability due to the increase in the radio frequency noise floor and resulting degradation of signal quality between sensor devices and the host controller.

SUMMARY

Concepts and technologies are disclosed herein for limiting service availability when a sensor device is non-operational due to a noise floor change. According to one aspect of the concepts and technologies disclosed herein, a connected home system includes a controller device configured to monitor a plurality of sensor devices deployed within a premises, and a sensor device of the plurality of sensor devices. The sensor device can monitor radio frequency ("RF") noise in a radio environment associated with the premises. The radio environment is associated with an RF noise floor. The sensor device can determine whether the radio frequency noise exceeds a noise threshold. In response to determining that the RF noise exceeds the noise threshold, the sensor device can cause the controller device to exclude the sensor device from being monitored by the controller device until the RF noise returns to below the noise threshold.

In some embodiments, the sensor device can cause the controller device to exclude the sensor device from being monitored by the controller device until the RF noise returns to below the noise threshold by generating a message and sending the message to the controller device. The message can instruct the controller device to exclude the sensor device from being monitored by the controller device until the RF noise returns to below the noise threshold. The controller device can receive the message from the sensor device and can exclude the sensor device from being monitored as a two-way device. This is because the controller device will not receive an acknowledgment (ACK) message from the sensor device since the sensor device will not send an ACK message due to noise. When the sensor device determines that the RF noise has returned to below the noise threshold, the sensor device can cause the controller device to resume normal monitoring of the sensor device. The sensor device can cause the controller device to resume monitoring of the sensor device by generating a further message that instructs the controller device to resume monitoring and sending the further message to the controller device.

In some embodiments, the controller device can generate an alert directed to a monitoring center that provides, at least in part, a monitoring service for the connected home system. The alert can identify the sensor device as being temporarily offline. The controller device can send the alert to the monitoring center.

In some embodiments, the sensor device can establish the baseline RF noise floor for the radio environment. The sensor device can establish a further baseline RF noise floor for the radio environment. The baseline RF noise floor and the further baseline RF noise floor can be associated with different times of day.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
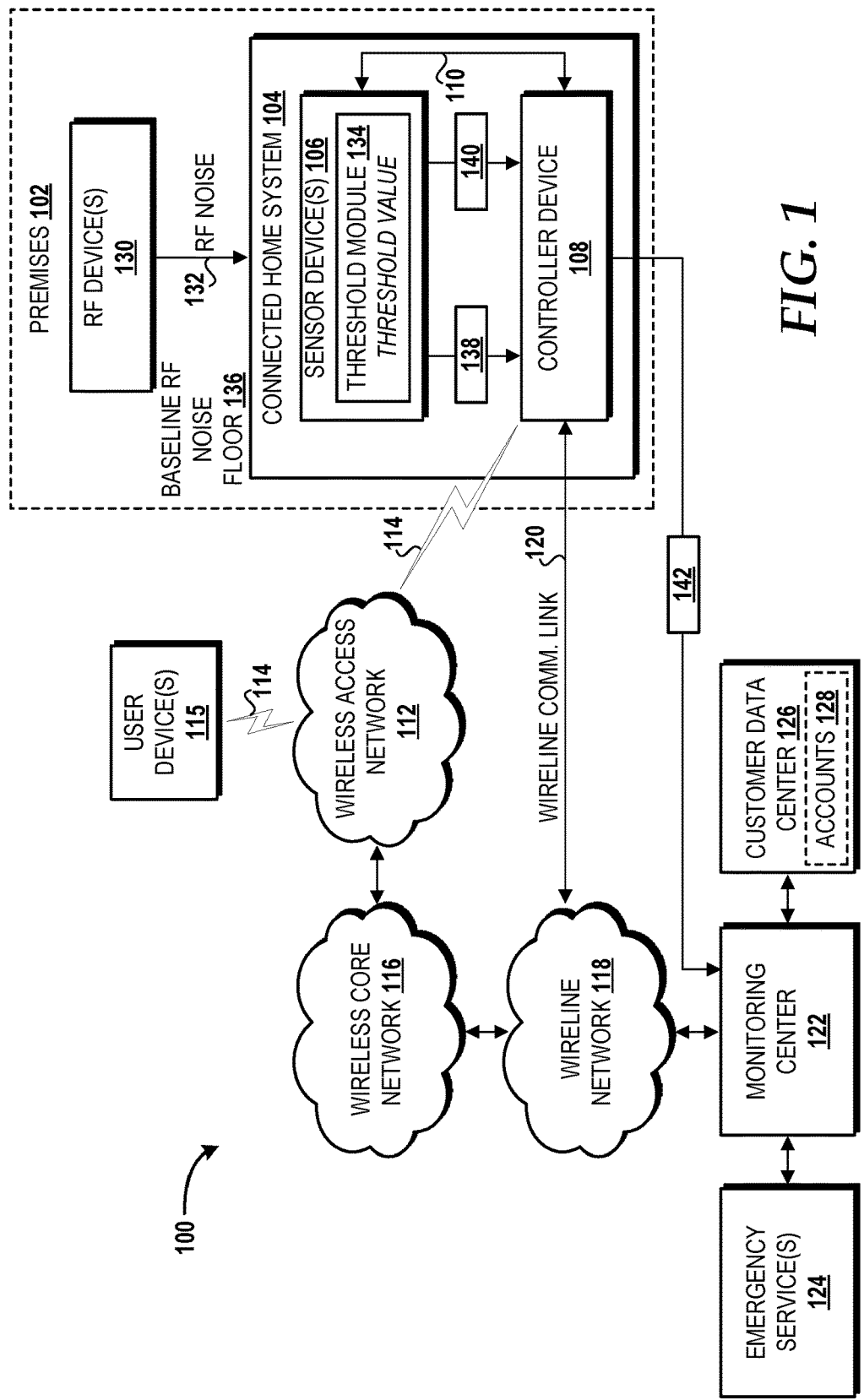
FIG. 1 is a block diagram illustrating aspects of an illustrative operating environment in which the concepts and technologies disclosed herein may be implemented.

The concepts and technologies disclosed herein are directed to limiting service availability when a sensor device is non-operational due to a noise floor change. The number of wireless devices and other customer equipment utilized by households worldwide keeps increasing. Utilizing wireless technology is a common approach for many security and connected home systems. The extensive use of wireless technology increases the radio frequency noise floor for at least a portion of the system. This can limit customer security and can make part of the premise practically unprotected. The affected area could be away from a main controller, and basically a controller jamming detection of the main controller will not be activated and most likely this sensor device will marked as an offline device.

The concepts and technologies disclosed herein can implement a robust noise detection threshold based upon a radio link assessment for sensor devices utilizing Neyman-Pearson criteria when a radio environment will be changed. The proposed algorithm can make a determination between intentional jamming (correlated jamming signal), which should be reported as an alarm event, and a change in noise floor (e.g., white Gaussian or other kind of noise). When the noise floor is above this threshold, the system can receive an alert and any sensor in the affected area can be excluded from monitoring until the noise is cleared. This will provide monitoring for the rest of the system and the noisy area is excluded until the noise signal returns to below the threshold. An alert message can be provided to the customer and/or a monitoring center.

Moreover, the concepts and technologies disclosed herein can add an enhancement for wireless security systems and other systems, such as connected home systems, when the radio environment is changed, especially in non-licensed radio bands. In particular, a determination can be made whether signal quality is above a statistical threshold for system availability following UL/CE standards.

It should be appreciated that the above-described subject matter may be implemented as a computer-controlled apparatus, a computer process, a computing system, or as an article of manufacture such as a computer-readable storage medium. These and various other features will be apparent from a reading of the remaining Detailed Description and a review of the associated drawings.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of limiting service availability when a sensor device is non-operational due to a noise floor change will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a premises 102. The premises 102 will be described herein as a residential structure such as a single-family home, duplex, triplex, condominium, apartment, or the like. It should be understood, however, that the concepts and technologies disclosed herein can be applied to other premises that might be or might include outdoor environments, stadiums, tents and other temporary structures, parking garages, commercial buildings, outdoor sales events, festivals, concerts, retail stores, restaurants, and/or the like.

A connected home system 104 is deployed within the premises 102. The illustrated connected home system 104 includes one or more sensor devices 106 that are controlled/monitored by a controller device 108. The connected home system 104 can provide one or more connected home services to one or more users (also referred to herein as customers; not shown). A connected home service can be or can include a security service, a home automation service, or any other service that provides additional functionality to one or more aspects of the premises 102 via the use of the sensor devices 106 and the controller device 108 of the connected home system 104.

Figure 3:
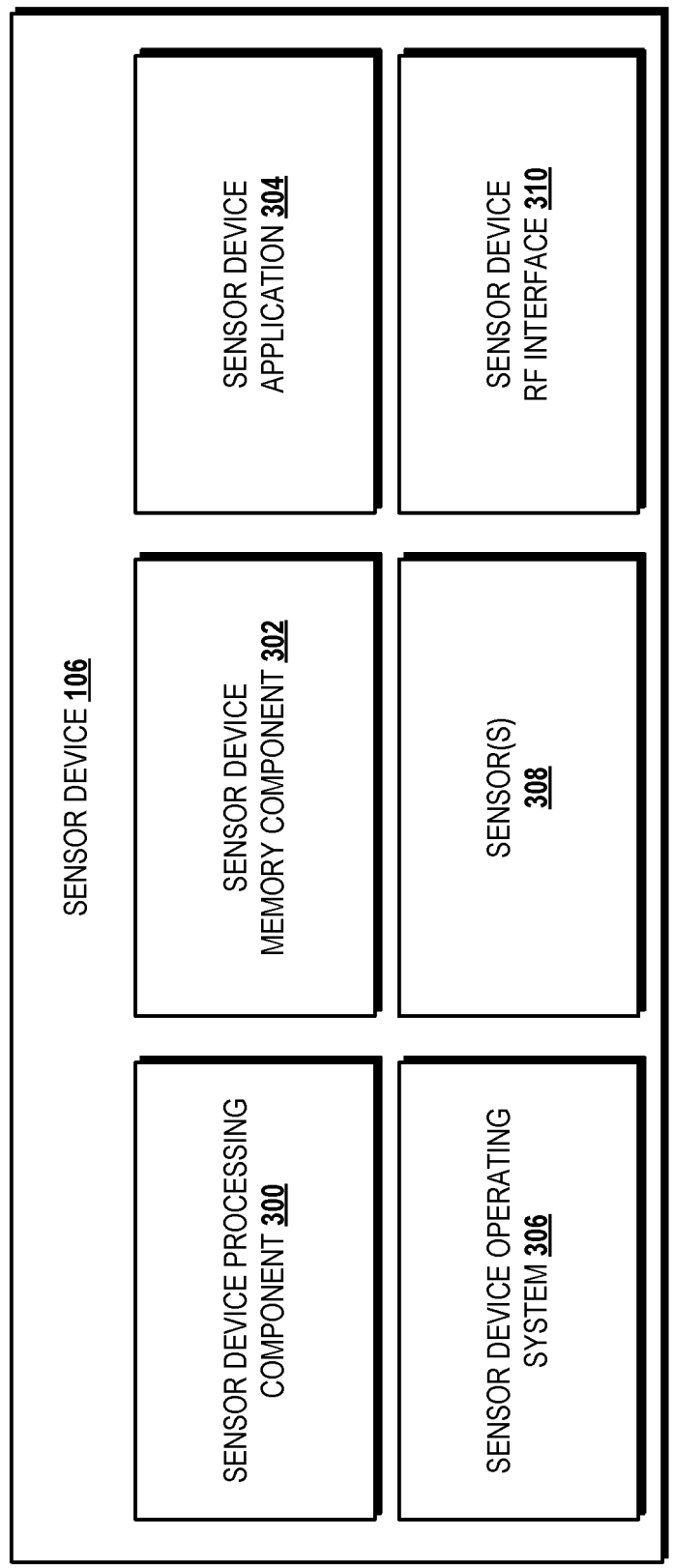
FIG. 3 is a block diagram illustrating an example sensor device capable of implementing aspects of the embodiments presented herein.

Each of the sensor devices 106 can be or can include any number of sensors (best shown in FIG. 3). Some examples of the sensor devices 106 include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof.

In some embodiments, the sensor devices 106 are deployed in one or more zones of the premises 102. A zone can include, for example, an area served by each sensor device 106 or some combination of the sensor devices 106. The zones can be defined by the controller device 108, which can maintain a database of the sensor devices 106 deployed in the premises 102 and the zone(s) associated therewith.

The sensor device 106 can interact with the controller device 108 via one or more interfaces 110, which can be wired or wireless. The interface 110 embodied as a wireless interface can include one or more antennas, one or more receivers, and one or more transmitters for facilitating communication between the sensor device 106 and the controller device 108. As such, the interface 110 can be configured in accordance with any proprietary or standardized wireless communications technologies to facilitate communication with the controller device 108, some examples of which include, but are not limited to, Institute of Electrical and Electronic Engineers ("IEEE") 802.11 standards, such as IEEE 802.11a, 802.11b, 802.11g, 802.11n, and draft/future 802.11 standards (referred to herein collectively as WI-FI), BLUETOOTH, wireless USB, Z-Wave, ZIGBEE, unlicensed, combinations thereof, and the like. The interface 110 embodied as a wired interface can be or can include a proprietary wired interface or a standardized wired interface such as Ethernet, High Definition Media Interface ("HDMI"), Universal Serial Bus ("USB"), combinations thereof, and the like.

The controller device 108 is illustrated as being in communication with a wireless access network 112 via a wireless communications link 114. Other devices, such as one or more user devices 115, are also shown as being in communication with the wireless access network 112. The wireless access network 112 can include one or more radio access networks ("RANs"). A RAN can utilize various channel access methods including, but not limited to, Time Division Multiple Access ("TDMA"), Frequency Division Multiple Access ("FDMA"), Single Carrier FDMA ("SC-FDMA"), Code Division Multiple Access ("CDMA"), wideband CDMA ("W-CDMA"), Orthogonal Frequency Division Multiplexing ("OFDM"), Space Division Multiple Access ("SDMA"), and/or the like to provide a radio/air interface to the controller device 108. Data communications can be provided in part by General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), Long-Term Evolution ("LTE"), and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like. A RAN can include various components such as, but not limited to, base transceiver stations ("BTSs"), Node-Bs or e-Node-Bs, base station controllers ("BSCs"), radio network controllers ("RNCs"), and the like.

The illustrated wireless access network 112 is in communication with a wireless core network 116. The wireless core network 116 can be or can include an evolved packet core ("EPC") a circuit-switched core network ("CS CN"), a packet-switched core network ("PS CN"), an IP multimedia subsystem ("IMS") core network, multiples thereof, and/or combinations thereof. The wireless core network 116 can utilize one or more mobile telecommunications technologies, such as, but not limited to, Global System for Mobile communications ("GSM"), CDMA ONE, CDMA2000, Universal Mobile Telecommunications System ("UMTS"), LTE, Worldwide Interoperability for Microwave Access ("WiMAX"), other 802.XX technologies (e.g., 802.11 WI-FI), and the like.

The controller device 108 also is illustrated as being in communication with a wireline network 118 via a wireline communications link 120. The wireline communications link 120 can be provided as an optional, backup link for the wireless communications link 114. The wireline network 118 can be or can include one or more packet-switched networks. The wireline communications link 120 can be or can include any wireline cabling, some examples of which include coaxial cable and fiber optic cable.

The wireline network 118 is also shown as being in communication with a monitoring center 122, which, in turn, is in communication with one or more emergency services 124. The monitoring center 122 can monitor the controller device 108 for alarms based upon data provided to the controller device 108 by the sensor devices 106. In response to detecting an alarm, personnel associated with the monitoring center 122 can communicate with the emergency services 124 on behalf of one or more customers associated with the premises 102 to dispatch the police, fire, and/or emergency medical authorities to the premises 102. Additionally, the monitoring center 122 can provide a notification of the dispatch to the controller device 108 and/or to one or more other devices, such as a mobile telephone, to notify the customer(s) that emergency authorities have been dispatched to the premises 102. The notification can include a telephone call, a text message, an application notification, a combination thereof, and/or the like.

The monitoring center 122 also is in communication with a customer data center 126. The customer data center 126 can store one or more accounts 128 associated with customers of one or more connected home services provided within the premises 102 by the connected home system 104. The account(s) 128 can include personal information, such as name, service address, billing address, telephone number, e-mail address, service description, billing information, and any other information associated with customers of one or more connected home services.

The operating environment 100 also includes one or more RF devices 130. The RF devices 130 are illustrated as being external to the connected home system 104. The illustrated RF devices 130 are intended to encompass devices that emit RF noise 132 into a radio environment associated with the premises 102 and, in general, the RF devices 130 are not functioning directly as part of the connected home system 104. It should be understood, however, that the sensor devices 106 also emit RF noise and can contribute to overall RF noise (not illustrated) that exists in the radio environment associated with the premises 102. The RF devices 130 can include any device that includes one or more components that emits RF signals. Emission of RF signals by the RF devices 130 can be intentional, unintentional, or incidental.

The illustrated sensor device 106 contains a threshold module 134 that can be executed by one or more processing components (best shown in FIG. 3) to detect whether the RF noise 132 meets or exceeds a threshold value set for a noise threshold of the radio environment associated with the premises 102. The threshold value identifies a noise level above a baseline RF noise floor 136 of the radio environment associated with the premises 102. The threshold value can be set by an entity, some examples of which include a user of the connected home system 104 or a service provider of a connected home service that utilizes the connected home system 104. The baseline RF noise floor 136 is indicative of the radio environment of the premises 102, including RF energy emitted by all devices, including the sensor device(s) 106 and the controller device 108. In addition, the baseline RF noise floor 136 can include RF energy emitted by at least a portion of the RF devices 130—for example, one or more of the RF devices 130 that frequently operates within the premises 102. The frequency with which such RF devices operate within the premises 102 can be indicative of whether the RF energy emitted by these devices is considered to be part of the baseline RF noise floor 136, or alternatively, part of the RF noise 132. The RF noise 132 includes RF energy above the baseline RF noise floor 136.

It should be understood that the threshold module 134 can set the baseline RF noise floor 136 based upon all devices operating within the premises 102 at or around the time when the sensor device 106 is deployed within the premises 102. The threshold module 134 can adjust the baseline RF noise floor 136 to account for more or less persistent RF energy within the radio environment. What constitutes persistent RF energy can be, for example, based upon RF energy that exists within the premises 102 for a pre-defined period of time and/or a frequency with which the RF energy is present. If, for example, the mobile device is associated with a visitor to the premises 102, the RF energy emitted by the mobile device can be considered RF noise 132. If, over time, the same or similar RF energy emitted by the mobile device is present, that RF energy can be added to the baseline RF noise floor 136, thereby establishing a new noise floor for the radio environment of the premises 102. Similarly, if the mobile device leaves the premises 102 or is not detected for a specified amount of time or with a certain frequency (e.g., every day), then the RF energy associated therewith can be removed from the new baseline RF noise floor, thereby returning the baseline RF noise floor 136 to the original value.

If the threshold module 134 determines that the RF noise 132 exceeds the threshold value set for the noise threshold, then the threshold module 134 can generate a message 138 directed to the controller device 108. The message 138 can instruct the controller device 108 to temporarily exclude the sensor device 106 from being monitored because of high noise floor. When the RF noise 132 returns to below the threshold value set for the noise threshold, the sensor device 106 can generate a further message 140 directed to the controller device 108. The further message 140 can instruct the controller device 108 to resume monitoring the sensor device 106. The controller device 108, in some embodiments, can send an alert 142 to the monitoring center 122 to inform the monitoring center 122 that the sensor device 106 is currently unavailable. The controller device 108 can send the alert 142 additionally or alternatively to a customer associated therewith.

It should be understood that some implementations of the operating environment 100 include multiple premises 102, multiple connected home systems 104, multiple controller devices 108, multiple interfaces 110, multiple wireless access networks 112, multiple wireless communication links 114, multiple wireless core networks 116, multiple wireline networks 118, multiple wireline communications links 120, multiple monitoring centers 122, multiple customer data centers 126, multiple threshold modules 134, multiple messages 138, multiple further messages 140, multiple alerts 142, or some combination thereof. Thus, the illustrated embodiment should be understood as being illustrative, and should not be construed as being limiting in any way.

Figure 2:
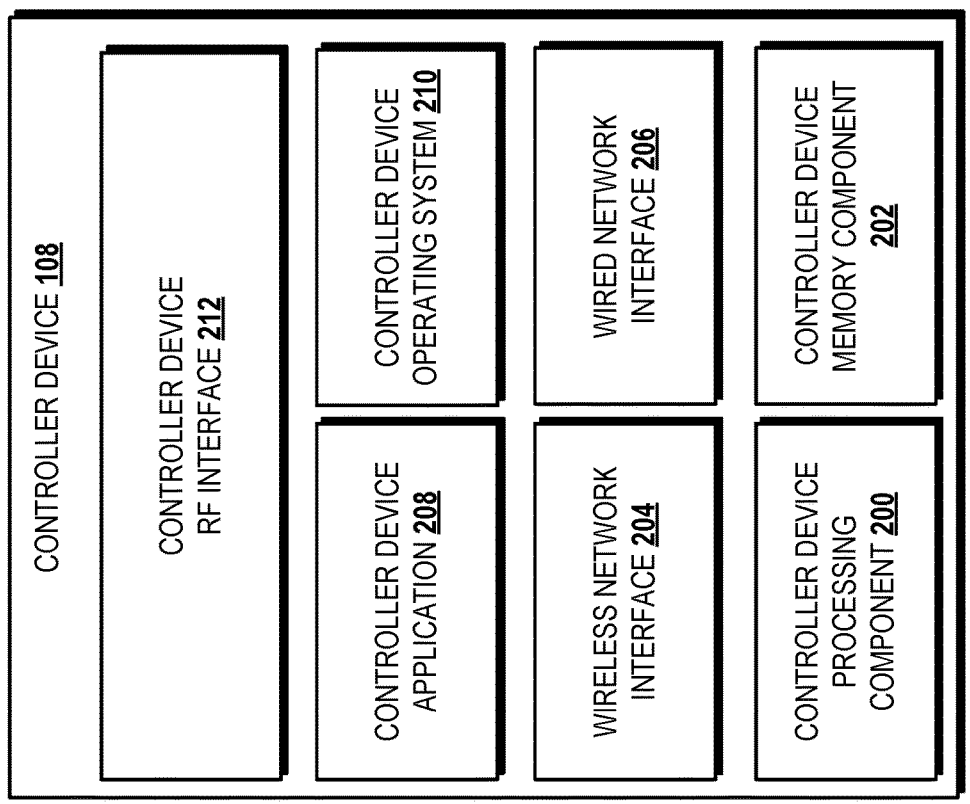
FIG. 2 is a block diagram illustrating an example controller device capable of implementing aspects of the embodiments presented herein.

Turning now to FIG. 2, a block diagram illustrating an example of the controller device 108 that is capable of implementing aspects of the embodiments presented herein will be described. The illustrated controller device 108 includes a controller device processing component 200, a controller device memory component 202, a wireless network interface 204, a wired network interface 206, a controller device application 208, a controller device operating system 210, and a controller device RF interface 212. FIG. 2 will be described with additional reference to FIG. 1.

The controller device processing component 200 can include one or more hardware components that perform computations to process data, and/or to execute computer-executable instructions of one or more application programs, such as the controller device application 208, the controller device operating system 210, and/or other software. The controller device processing component 200 can include one or more central processing units ("CPUs") configured with one or more processing cores. The controller device processing component 200 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the controller device processing component 200 can include one or more discrete GPUs. In some other embodiments, the controller device processing component 200 can include CPU and GPU components that are configured in accordance with a co-processing CPU/GPU computing model, wherein the sequential part of an application executes on the CPU and the computationally-intensive part is accelerated by the GPU. The controller device processing component 200 can include one or more system-on-chip ("SoC") components along with one or more other components illustrated as being part of the controller device 108, including, for example, the controller device memory component 202. In some embodiments, the controller device processing component 200 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The controller device processing component 200 can be or can include one or more hardware components architected in accordance with an ARM architecture, available for license from ARM HOLDINGS of Cambridge, United Kingdom. Alternatively, the controller device processing component 200 can be or can include one or more hardware components architected in accordance with an x86 architecture, such an architecture available from INTEL CORPORATION of Mountain View, Calif., and others. Those skilled in the art will appreciate the implementation of the controller device processing component 200 can utilize various computation architectures, and as such, the controller device processing component 200 should not be construed as being limited to any particular computation architecture or combination of computation architectures, including those explicitly disclosed herein.

The controller device memory component 202 can include one or more hardware components that perform storage operations, including temporary or permanent storage operations. In some embodiments, the controller device memory component 202 can include volatile and/or non-volatile memory implemented in any method or technology for storage of information such as computer-readable instructions, data structures, program modules, the controller device operating system 210, the controller device application 208, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the controller device processing component 200.

The wireless network interface 204 can include one or more antennas, one or more receivers, and one or more transmitters for facilitating communication with the wireless access network 112. As such, the wireless network interface 204 can be configured in accordance with any proprietary or standardized wireless communications technologies, some examples of which include the technologies described herein above with respect to the wireless access network 112. Alternatively or additionally, in a dual-mode configuration, the wireless network interface 204 can include an interface that operates in accordance with Institute of Electrical and Electronic Engineers ("IEEE") 802.11 standards, such as IEEE 802.11a, 802.11b, 802.11g, 802.11n, and draft/future 802.11 standards (referred to herein collectively as WI-FI), BLUETOOTH, wireless USB, Z-Wave, ZIGBEE, or the like to communicate with an external interface, such as a modem, that, in turn, connects to the wireless access network 112.

The wired network interface 206 can include hardware for facilitating communication with the wireline network 118 via the wireline communications link 120. The wired network interface 206 can be or can include a proprietary wired interface or a standardized wired interface such as Ethernet, High Definition Media Interface ("HDMI"), Universal Serial Bus ("USB"), or the like. The wired network interface 206 can provide a direct connection, via the wireline communications link 120, to the wireline network 118, or can provide a connection to an external interface, such as a modem, that, in turn, connects to the wireline network 118.

The controller device application 208 can be executed by the controller device processing component 200 to perform operations to provide, at least, in part, a connected home service to one or more users. The controller device application 208 can provide a user interface (not shown) accessible by one or more users via the user device 115 via a dedicated application and/or via a web browser and/or directly on the controller device 108. In the latter embodiment, the controller device 108 can include or can be connected to one or more displays (also not shown) configured to present in a visual manner the user interface. The user interface, whether accessed remotely via the user device 115 or directly on the controller device 108 can receive input from one or more users to control the sensor devices 106, including powering on/off, configuring settings, updating software/firmware, and otherwise controlling operations of the sensor device 106.

The controller device operating system 210 can control the operation of the controller device 108. In some embodiments, the controller device operating system 210 includes the functionality of the controller device application 208. The controller device operating system 210 can be executed by the controller device processing component 200 to cause the controller device 108 to perform various operations. The controller device operating system 210 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The controller device RF interface 212 can include one or more antennas and one or more RF receivers for receiving RF signals from and one or more RF transmitters for sending RF signals to the sensor devices 106. The controller device RF interface 212 can receive, for example, data from the sensor devices 106 regarding measurements taken by the sensor devices 106, the message(s) 138, the further message(s) 140, the alert(s) 142, and/or other events. The controller device RF interface 212 also can send instructions to the sensor devices 106 to perform operations. The controller device RF interface 212 can utilize, for example, WI-FI, BLUETOOTH, wireless USB, Z-Wave, ZIGBEE, unlicensed, combinations thereof, and the like.

It should be understood that some implementations of the controller device 108 can include multiple controller device processing components 200, multiple controller device memory components 202, multiple wireless network interfaces 204, multiple wired network interfaces 206, multiple controller device applications 208, multiple controller device operating systems 210, multiple controller device RF interfaces 212, or some combination thereof. Thus, the illustrated embodiment should be understood as being illustrative, and should not be construed as being limiting in any way.

Turning now to FIG. 3, a block diagram illustrating an example of the sensor device 106 capable of implementing aspects of the embodiments presented herein will be described. The illustrated sensor device 106 includes a sensor device processing component 300, a sensor device memory component 302, a sensor device application 304, a sensor device operating system 306, one or more sensor device sensors 308, and a sensor device RF interface 310. FIG. 3 will be described with additional reference to FIG. 1.

The sensor device processing component 300 (also referred to herein as a "processor") can include one or more hardware components that perform computations to process data, and/or to execute computer-executable instructions of one or more application programs such as the sensor device application 304, one or more operating systems such as the sensor device operating system 306, and/or other software. The sensor device processing component 300 can include one or more CPUs configured with one or more processing cores. The sensor device processing component 300 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the sensor device processing component 300 can include one or more discrete GPUs. In some other embodiments, the sensor device processing component 300 can include CPU and GPU components that are configured in accordance with a co-processing CPU/GPU computing model, wherein the sequential part of an application executes on the CPU and the computationally-intensive part is accelerated by the GPU. The sensor device processing component 300 can include one or more SoC components along with one or more other components illustrated as being part of the sensor device 106, including, for example, the sensor device memory component 302. In some embodiments, the sensor device processing component 300 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The sensor device processing component 300 can be or can include one or more hardware components architected in accordance with an ARM architecture, available for license from ARM HOLDINGS of Cambridge, United Kingdom. Alternatively, the sensor device processing component 300 can be or can include one or more hardware components architected in accordance with an x86 architecture, such an architecture available from INTEL CORPORATION of Mountain View, Calif., and others. Those skilled in the art will appreciate the implementation of the sensor device processing component 300 can utilize various computation architectures, and as such, the sensor device processing component 300 should not be construed as being limited to any particular computation architecture or combination of computation architectures, including those explicitly disclosed herein.

The sensor device memory component 302 can include one or more hardware components that perform storage operations, including temporary or permanent storage operations. In some embodiments, the sensor device memory component 302 can include volatile and/or non-volatile memory implemented in any method or technology for storage of information such as computer-readable instructions, data structures, program modules, the sensor device operating system 306, the sensor device application 304, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the sensor device processing component 300.

The sensor device application 304 can be executed by the sensor device processing component 300 to perform operations such as gathering data associated with the premises 102, sharing the data with the controller device 108, processing instructions received from the controller device 108, generating messages such as the message 138 and the further message 140, and other operations described herein. The sensor device application 304 can execute on top of the sensor device operating system 306. In some embodiments, the sensor device application 304 is provided as firmware. The sensor device application 304 can be or can include the threshold module 134.

The sensor device operating system 306 can control the operation of the sensor device 106. In some embodiments, the sensor device operating system 306 includes the functionality of the sensor device application 304 and/or the threshold module 134. The sensor device operating system 306 can be executed by the sensor device processing component 300 to cause the sensor device 106 to perform various operations. The sensor device operating system 306 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The sensor(s) 308 can include any sensor type or combination of sensor types utilizing any known sensor technology that is capable of detecting one or more characteristics of an environment, such as at least part of the premises 102, in which the sensor device 106 is deployed. More particularly, the sensor(s) 308 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof. The sensor(s) can be utilized, at least in part, to provide sensor data (e.g., data indicative of motion detection, a door being opened, smoke or carbon monoxide present, a doorbell ring, and/or the like) for use in providing the connected home service to one or more users. Those skilled in the art will appreciate the applicability of the sensors 308 to various aspects of connected home services, and for this reason, additional details in this regard are not provided.

The sensor device RF interface 310 can include an RF transceiver or separate receiver and transmitter components. The sensor device RF interface 310 can include one or more antennas and one or more RF receivers for receiving RF signals from and sending RF signals to the controller device 108. The sensor device RF interface 310 can receive, from the sensor devices 106, data associated with measurements taken by the sensor devices 106, the message 138, the further message 140, and other events. The sensor device RF interface 310 also can send instructions to the sensor devices 106 to perform operations.

It should be understood that some implementations of the sensor device 106 can include multiple sensor device processing components 300, multiple sensor device memory components 302, multiple sensor device applications 304, multiple sensor device operating systems 306, multiple sensor device RF interfaces 310, or some combination thereof. Thus, the illustrated embodiment should be understood as being illustrative, and should not be construed as being limiting in any way.

Figure 4:
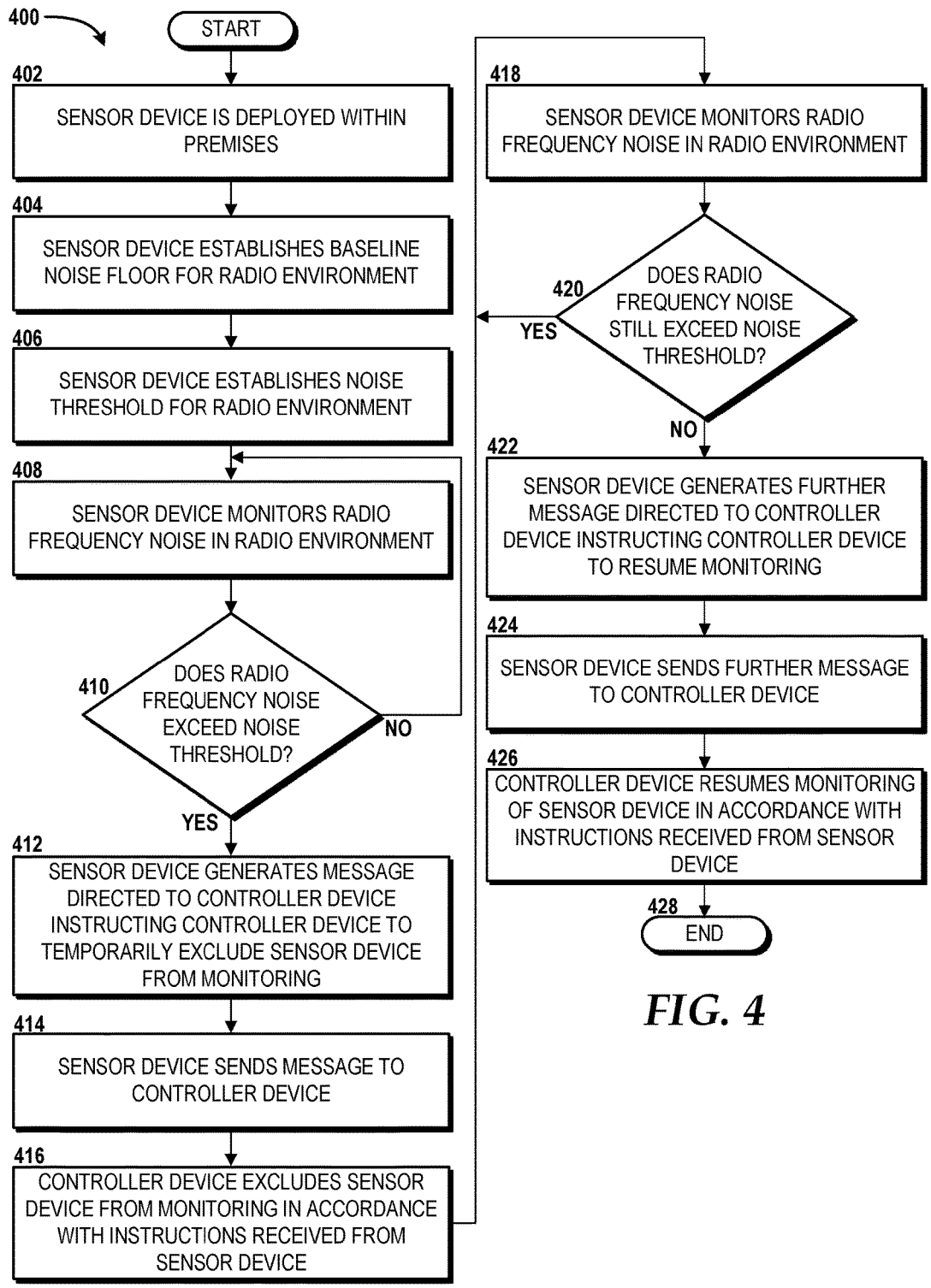
FIG. 4 is a flow diagram illustrating aspects of a method for excluding the sensor device from monitoring, according to an illustrative embodiment.

Turning now to FIG. 4, a flow diagram illustrating aspects of a method 400 for excluding the sensor device 106 from monitoring will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the connected home system 104, of the sensor device(s) 106, of the controller device 108, and/or one or more other computing systems and/or devices disclosed herein to perform operations.

For purposes of illustrating and describing some of the concepts of the present disclosure, the methods disclosed herein are described as being performed, at least in part, by the connected home system 104, the sensor device(s) 106, and/or the controller device 108 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described from the perspective of the sensor device 106 executing the threshold module 134. The method 400 begins and proceeds to operation 402, where the sensor device 106 is deployed within the premises 102. From operation 402, the method proceeds to operation 404, where the sensor device 106 establishes the baseline RF noise floor 136. In some embodiments, the sensor device 106 can monitor RF energy within the radio environment of the premises 102 over time to establish the baseline RF noise floor 136, which can include an average RF energy present in the premises 102. In some embodiments, the sensor device 106 can establish multiple baseline RF noise floors 136, each of which is utilized for a different time of day. For example, on weekdays from 9 AM to 5 PM the baseline RF noise floor 136 might be lower than from 5:01 PM to 8:59 AM to account for when users are at the premises 102 using their devices that emit RF energy.

From operation 404, the method 400 proceeds to operation 406, where the sensor device 106 establishes a value for a noise threshold. The noise threshold for a particular device can be established during the installation thereof, and can be updated over time using an adaptive algorithm, whereby the RF link between the sensor device 106 and the controller device 108 would be assessed over time (e.g., daily, weekly, or some other time interval). One non-limiting example for setup of a noise threshold value can be in accordance with USACE/NAVFAC/AFCEC/NASA UFGS-28 20 01.00 10 (October 2007) such that: a false alarm rate of no more than 1 false alarm per sensor per 30 days at a specified probability of detection for interior alarms; a false alarm rate of no more than 1 false alarm per sensor per 5 days at the specified probability of detection an environmental alarm during nominal conditions that shall not exceed 1 per day per sensor for exterior alarms; error and throughput rates of single portal performance rates obtained when processing individuals one at a time; a Type I error rate is an error where the system denies entry to an authorized, enrolled identifier or individual (the rate shall be less than 1 percent); and a Type II error rate is an error where the system grants entry to an unauthorized identifier or individual. The entry control Type II error rate shall be less than [0.1] [0.01] [0.001] percent.

From operation 406, the method 400 proceeds to operation 408, where the sensor device 106 monitors the RF noise 132 in the radio environment. From operation 408, the method 400 proceeds to operation 410 where the sensor device 106 determines whether the RF noise 132 monitored at operation 408 exceeds the noise threshold. If the sensor device 106 determines that the RF noise 132 exceeds the noise threshold, the method proceeds to operation 412, where the sensor device 106 generates the message 138 directed to the controller device 108 to instruct the controller device 108 to temporarily exclude the sensor device 106 from monitoring. From operation 412, the method 400 proceeds to operation 414, where the sensor device 106 sends the message 138 to the controller device 108.

From operation 414, the method 400 proceeds to operation 416, where the controller device 108 excludes the sensor device 106 from monitoring in accordance with the instructions received from the sensor device 106 via the message 138. From operation 416, the method 400 proceeds to operation 418, where the sensor device 106 monitors the RF noise 132 in the radio environment. From operation 418, the method proceeds to operation 420, where the sensor device 106 determines whether the RF noise 132 still exceeds the noise threshold. If the sensor device 106 determines that the RF noise 132 still exceeds the noise threshold, the method 400 returns to operation 418, where the sensor device 106 continues to monitor the RF noise 132 in the radio environment. If, however, the sensor device 106 determines that the RF noise 132 no longer exceeds the noise threshold, the method 400 proceeds to operation 422.

At operation 422, the sensor device 106 generates the further message 140 directed to the controller device 108 instructing the controller device 108 to resume monitoring the sensor device 106. From operation 422, the method 400 proceeds to operation 424, where the sensor device 106 sends the further message 140 to the controller device 108. From operation 424, the method 400 proceeds to operation 426, where the controller device 108 resumes monitoring of the sensor device 106. From operation 426, the method 400 proceeds to operation 428, where the method 400 ends.

Returning to operation 410, if the sensor device 106 determines that the RF noise 132 does not exceed the noise threshold, the method 400 returns to operation 408, where the sensor device 106 monitors the RF noise 132 in the radio environment. This loop continues until the RF noise 132 exceeds the noise threshold.

Figure 5:
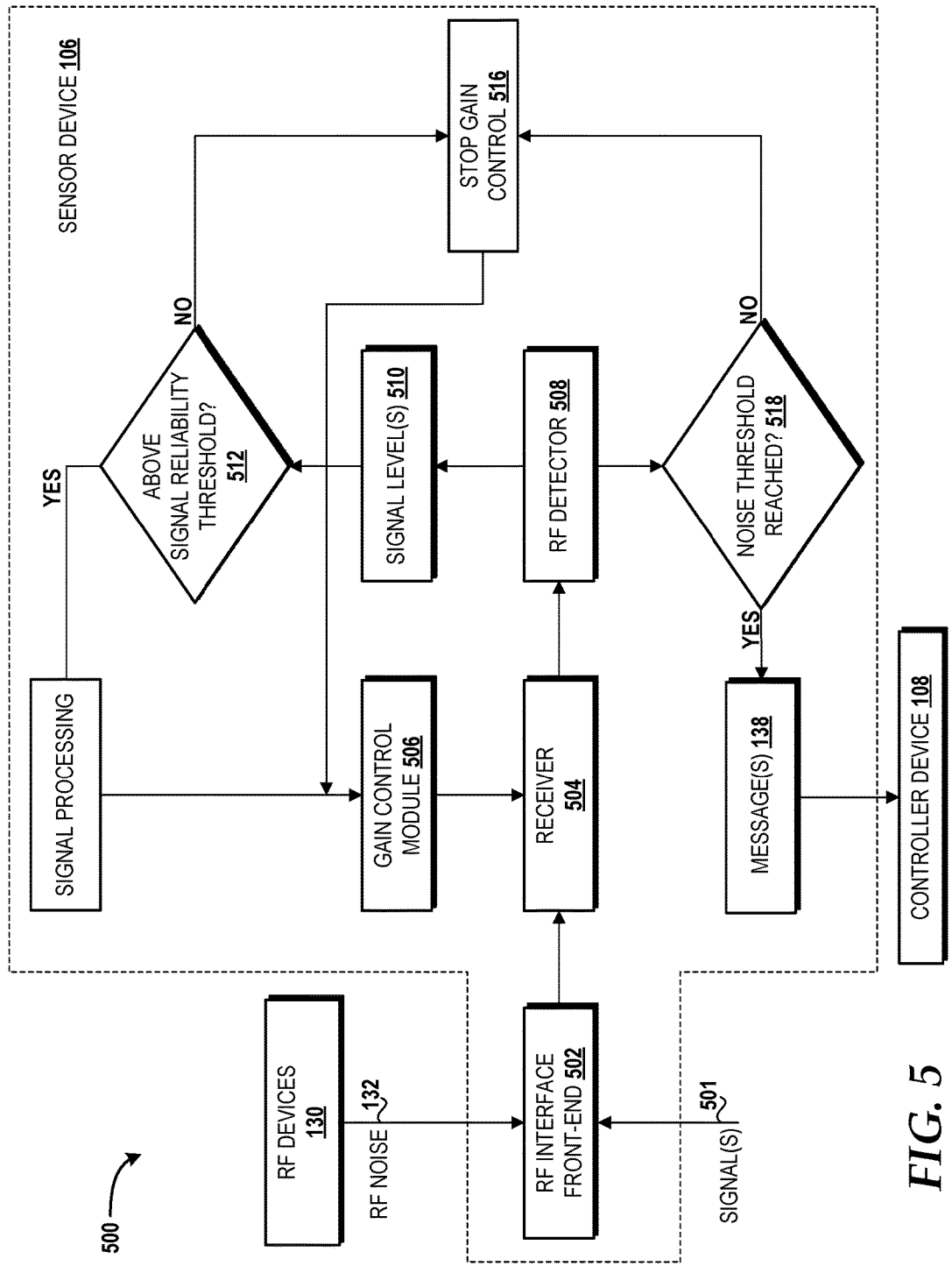
FIG. 5 is a block diagram illustrating an example logical design of the sensor device and interactions with RF devices and the controller device, according to an illustrative embodiment.

Turning now to FIG. 5, an example logical design 500 of the sensor device 106 and interactions with the RF devices 130 and the controller device 108 will be described, according to an illustrative embodiment. The logical design 500 includes the RF devices 130 that emit the RF noise 132 that can be sensed by the sensor device 106. More particularly, the logical design 500 details aspects of the sensor device 106 in performing various operations described herein above with reference to the method 400 introduced in FIG. 4.

The illustrated sensor device 106 receives one or more signals 501, which can include the signals associated with the RF noise 132, via an RF interface front-end 502, which, in turn, provides the signal(s) 501 from the controller device 108 and, potentially, other devices, such as one or more devices operating in non-licensed ISM bands to a receiver 504 with automatic gain control ("AGC") provided by a gain control module 506. The receiver 504 passes the signal(s) 501 to an RF detector 508. The RF detector 508 determines a signal level 510 for each of the signals 501 and passes the signal level 510 to logic that determines whether the signal level 510 is above a signal reliability threshold (generally shown at 512). The signal reliability threshold is tied to signal detection and not noise detection. A given signal of the signals 501 shall be detected even in the presence of noise such that the signal-to-noise ratio is above the signal reliability threshold. The sensor device 106 is to process the signal(s) 501, at least in part, by utilizing gain control via a gain control module 506 to raise the signal strength of the signal(s) 501 so that the sensor device 106 can distinguish incoming signals (e.g., from the controller device 108) from noise created by other device(s) located in and around the premises 102, such as the RF devices 130. If, however, it is determined that the signal level 510 is below the signal reliability threshold, flow proceeds to stop gain control (generally shown at 516) by the gain control module 506, and then back to the receiver 504, where the loop can repeat as needed.

The reliability threshold can be setup during the installation of the sensor device 106 based on a call back algorithm. For example, the reliability threshold can be setup minimizing probability of false alarm according to UL 1023 (i.e., Neyman-Pearson criteria). The reliability threshold can be setup for white Gaussian noise, which is a pure example of noise generated by customer appliances and other electronic devices. Another example can be found in the threshold following USACE/NAVFAC/AFCEC/NASA UFGS-28 20 01.00 10 (October 2007) standards, as described above. As yet another example, EN 50131-2-7-1:2012 (Part 2-7-1: Intrusion detectors for glass breaking) can be utilized such that: Pass/Fail criteria are established so at least 16 out of 18 attempts shall be detected for each glass type; and no single detector shall miss more than one time.

As mentioned above, the illustrated sensor device 106 can receive, among the signals 501, the RF noise 132 from the RF devices 130, also via the RF interface front-end 502, which, in turn, provides the signals 501 to the receiver 504. The receiver 504 passes the signals 501 to the RF detector 508. The RF detector 508, in addition to determining the signal levels 510 of the signals 501 as explained above, determines, as shown at 518, whether the signals 501 generate the RF noise 132 above a noise threshold. If so, the sensor device 106 can generate the message 138, and can send the message 138 to the controller device 108 to take the appropriate action. If the noise threshold is not reached, however, the sensor device 106 can utilize the gain control module 506 to stop gain control (generally shown at 516) and pass the signals 501 back to the receiver 504. It should be understood that although the noise threshold detection and the signal reliability threshold aspects are described separately, these aspects can occur simultaneously as the sensor device 106 processes incoming signals. Accordingly, the logical design 500 shown in FIG. 5 is merely illustrative and should not be construed as limiting of the operation of the sensor device 106.

Figure 6:
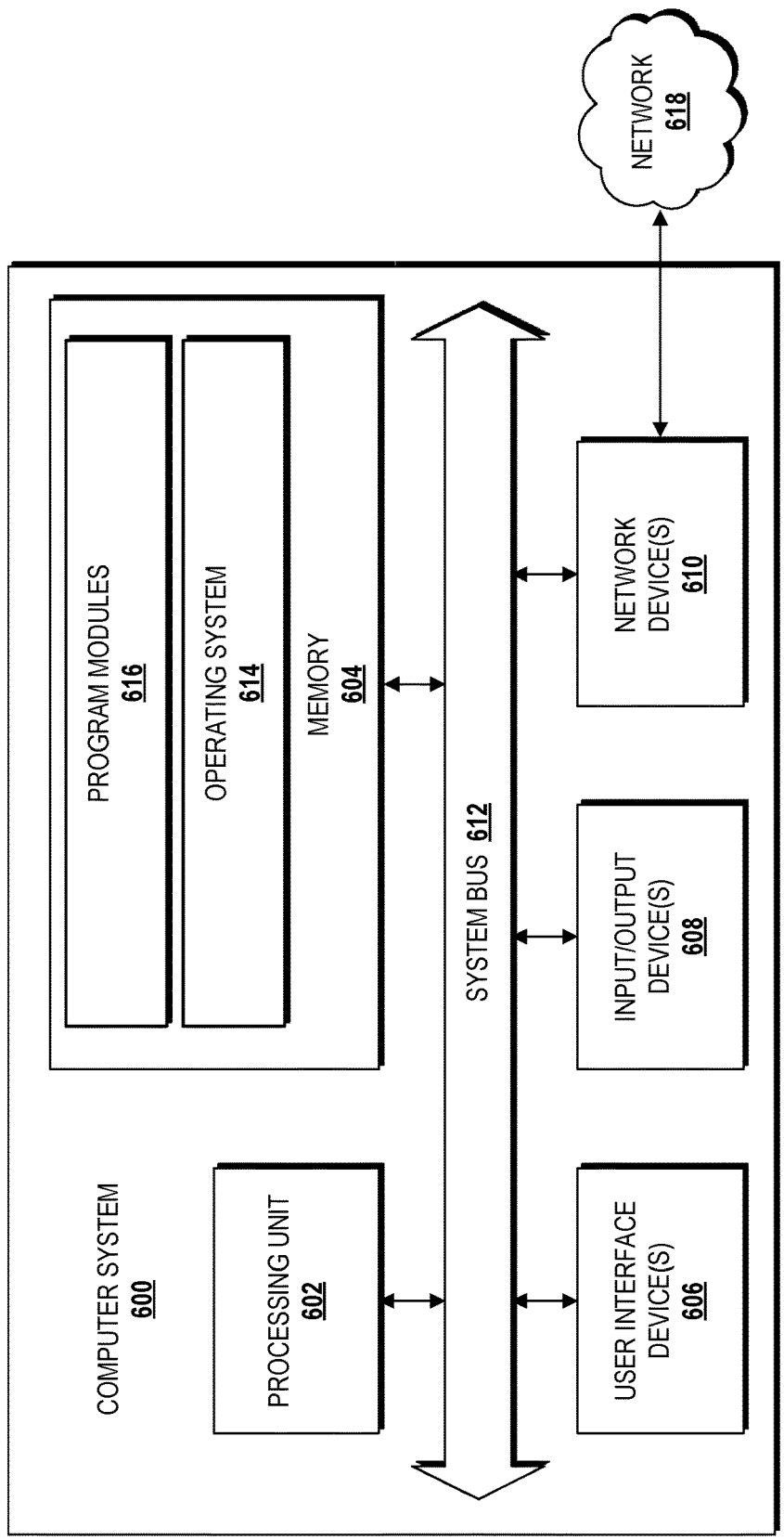
FIG. 6 is a block diagram illustrating an example computer system capable of implementing aspects of the embodiments presented herein.

Turning now to FIG. 6, a block diagram illustrating a computer system 600 configured to perform various operations disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the connected home system 104, the sensor device(s) 106, the controller device 108, the user device(s) 115, one or more systems utilized in the monitoring center 122, one or more systems utilized in the customer data center 126, other systems disclosed herein, or some combination thereof is/are configured, at least in part, like the computer system 600. It should be understood, however, that the connected home system 104, the sensor device(s) 106, the controller device 108, the user device(s) 115, one or more systems utilized in the monitoring center 122, one or more systems utilized in the customer data center 126, and/or other systems disclosed herein may include additional functionality or include less functionality than now described.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616.

The operating system 614 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The program modules 616 may include various software and/or program modules described herein. In some embodiments, for example, the program modules 616 include the controller device application 208 or the sensor device application 304. These and/or other programs can be embodied in computer-readable media containing instructions that, when executed by the processing unit 602, perform one or more of the method 400 described in detail above with respect to FIG. 4 and/or other functionality as illustrated and described herein. It can be appreciated that, at least by virtue of the instructions embodying the method 400 and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store any data described herein, if desired.

The user interface devices 606 may include one or more devices with which a user accesses the computer system 600. The user interface devices 606 may include, but are not limited to, computers, servers, personal digital assistants, telephones (e.g., cellular, IP, or landline), or any suitable computing devices. The I/O devices 608 enable a user to interface with the program modules. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, a touchscreen, or an electronic stylus. Further, the I/O devices 608 may include one or more output devices, such as, but not limited to, a display screen or a printer.

The network devices 610 enable the computer system 600 to communicate with other networks or remote systems via a network 618 (e.g., the wireless access network 112, the wireless core network 116, and/or the wireline network 118). Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a WLAN such as a WI-FI network, a WWAN, a wireless PAN ("WPAN") such as BLUETOOTH, or a wireless MAN ("WMAN"). Alternatively, the network 618 may be a wired network such as, but not limited to, a WAN such as the Internet, a LAN such as the Ethernet, a wired PAN, or a wired MAN.

Figure 7:
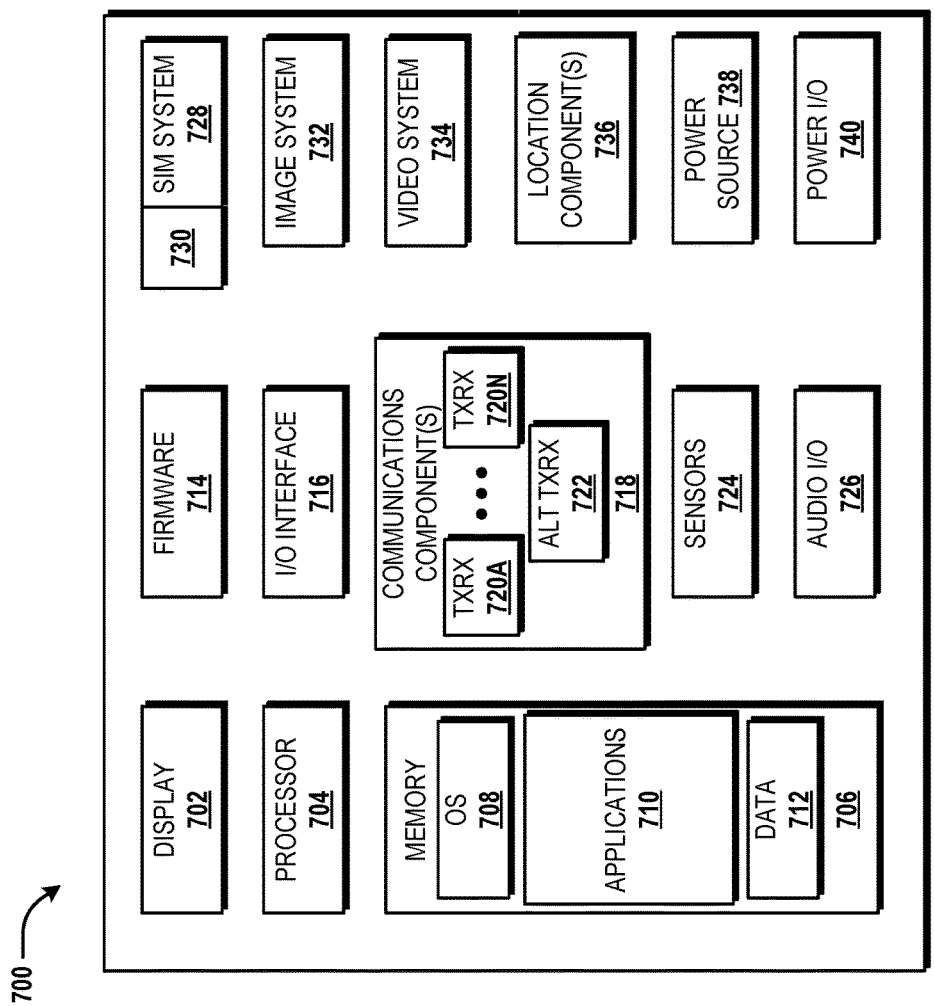
FIG. 7 is a block diagram illustrating an example mobile device capable of implementing aspects of the embodiments disclosed herein.

Turning now to FIG. 7, an illustrative mobile device 700 and components thereof will be described. In some embodiments, one or more of the user devices 115 described above with reference to FIG. 1 can be configured as and/or can have an architecture similar or identical to the mobile device 700 described herein in FIG. 7. It should be understood, however, that the user device(s) 115 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in the memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in data communications, entering/deleting data, entering and setting user IDs and passwords for device access, configuring settings, manipulating content and/or settings, multimode interaction, interacting with other applications 710, and otherwise facilitating user interaction with the operating system 708, the applications 710, and/or other types or instances of data 712 that can be stored at the mobile device 700.

The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the wireless access network 112, the wireless core network 116, and the wireline network 118 described herein. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments, one or more of the transceivers of the communications component 718 may be configured to communicate using GSM, CDMAONE, CDMA2000, LTE, and various other 2 G, 2.5 G, 3 G, 4 G, 4.5 G, 5 G and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 700 or other devices or computers described herein, such as the computer system 700 described above with reference to FIG. 7. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 700 in order to store and execute the software components presented herein. It is also contemplated that the mobile device 700 may not include all of the components shown in FIG. 7, may include other components that are not explicitly shown in FIG. 7, or may utilize an architecture completely different than that shown in FIG. 7.

Figure 8:
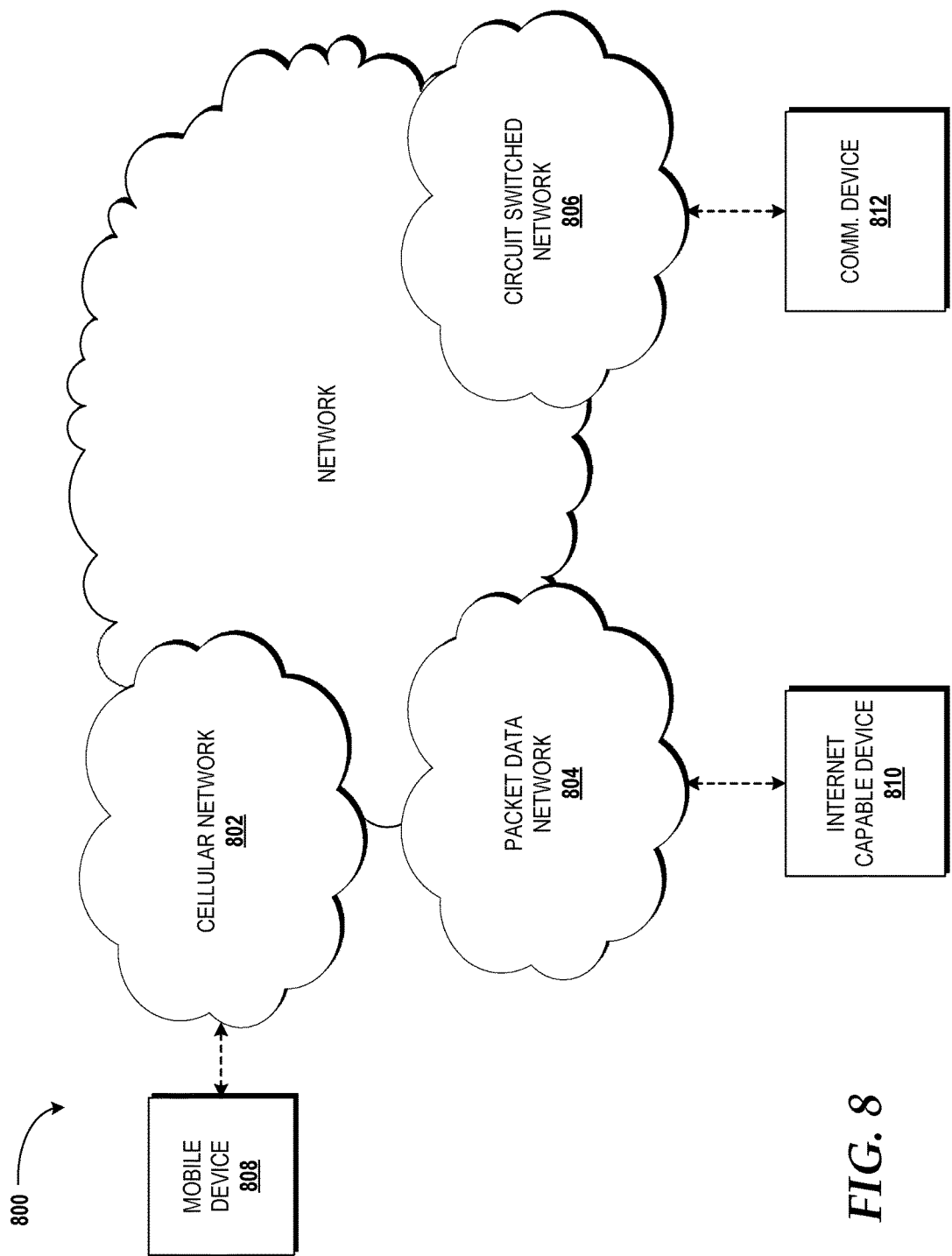
FIG. 8 schematically illustrates a network, according to an illustrative embodiment.

Turning now to FIG. 8, additional details of a network 800 are illustrated, according to an illustrative embodiment. The network 800 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the user device 115, a cellular telephone, a user equipment, a mobile terminal, a PDA, a laptop computer, a handheld computer, and combinations thereof, can be operatively connected to a cellular network. The cellular network 802 can be configured as a 2 G Global System for Mobile communications ("GSM") network and can provide data communications via General Packet Radio Service ("GPRS") and/or Enhanced Data rates for GSM Evolution ("EDGE"). Additionally, or alternatively, the cellular network 802 can be configured as a 3 G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 802 also is compatible with 4 G mobile communications standards such as Long-Term Evolution ("LTE"), or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with a packet data network through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 800 is used to refer broadly to any combination of the networks 802, 804, 806. It should be appreciated that substantially all of the functionality described with reference to the network 800 can be performed by the cellular network 802, the packet data network 804, and/or the circuit switched network 806, alone or in combination with other networks, network elements, and the like.

Based on the foregoing, it should be appreciated that concepts and technologies for limiting service availability when a sensor device is non-operational due to a noise floor change have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A connected home system comprising:
  a controller device configured to monitor a plurality of sensor devices deployed within a premises; and
  a sensor device of the plurality of sensor devices, the sensor device comprising
    a processor, and
    memory comprising sensor instructions that, when executed by the processor, cause the sensor device to perform sensor operations comprising
      in response to determining that a radio frequency noise exceeds a noise threshold of a radio environment associated with the premises, causing the controller device to exclude the sensor device from being monitored by the controller device until the radio frequency noise returns to below the noise threshold.

2. The connected home system of claim 1, wherein causing the controller device to exclude the sensor device from being monitored until the radio frequency noise returns to below the noise threshold comprises:
  generating a message directed to the controller device, wherein the message instructs the controller device to exclude the sensor device from being monitored by the controller device until the radio frequency noise returns to below the noise threshold; and
  sending the message to the controller device.

3. The connected home system of claim 2, wherein the controller device performs controller operations comprising:
  receiving the message from the sensor device; and
  excluding the sensor device from being monitored.

4. The connected home system of claim 3, wherein the sensor operations further comprise:
  determining that the radio frequency noise has returned to below the noise threshold; and
  causing the controller device to resume monitoring of the sensor device.

5. The connected home system of claim 4, wherein causing the controller device to resume monitoring of the sensor device comprises:
  generating a further message directed to the controller device, wherein the further message instructs the controller device to resume monitoring of the sensor device; and
  sending the further message to the controller device.

6. The connected home system of claim 5, wherein the controller device performs controller operations comprising:
  receiving the further message from the sensor device; and
  resuming monitoring the sensor device in monitoring.

7. The connected home system of claim 1, wherein the controller device performs controller operations comprising:
generating an alert directed to a monitoring center that provides, at least in part, a monitoring service for the connected home system, wherein the alert identifies the sensor device as being offline; and
sending the alert to the monitoring center.

8. The connected home system of claim 1, wherein the sensor operations further comprise establishing a baseline radio frequency noise floor for the radio environment.

9. The connected home system of claim 8, wherein the sensor operations further comprise establishing a further baseline radio frequency noise floor for the radio environment, wherein the baseline radio frequency noise floor and the further baseline radio frequency noise floor are established for different times of day.

10. A sensor device comprising:
a processor; and
memory comprising sensor instructions that, when executed by the processor, cause the sensor device to perform sensor operations comprising
in response to determining that a radio frequency noise exceeds a noise threshold of a radio environment associated with a premises, causing a controller device to exclude the sensor device from being monitored by the controller device until the radio frequency noise returns to below the noise threshold.

11. The sensor device of claim 9, wherein causing the controller device to exclude the sensor device from being monitored until the radio frequency noise returns to below the noise threshold comprises:
generating a message directed to the controller device, wherein the message instructs the controller device to exclude the sensor device from being monitored by the controller device until the radio frequency noise returns to below the noise threshold; and
sending the message to the controller device.

12. The sensor device of claim 10, wherein the sensor operations further comprise:
determining that the radio frequency noise has returned to below the noise threshold; and
causing the controller device to resume monitoring of the sensor device.

13. The sensor device of claim 12, wherein causing the controller device to resume monitoring of the sensor device comprises:
generating a further message directed to the controller device, wherein the further message instructs the controller device to resume monitoring of the sensor device; and
sending the further message to the controller device.

14. The sensor device of claim 10, wherein the sensor operations further comprise establishing a baseline radio frequency noise floor for the radio environment.

15. A computer-readable storage medium comprising computer-executable instructions that, when executed by a processor of a sensor device, causes the sensor device to perform operations comprising:
in response to determining that a radio frequency noise exceeds a noise threshold of a radio environment associated with a premises, causing a controller device to exclude the sensor device from being monitored by the controller device until the radio frequency noise returns to below the noise threshold.

16. The computer-readable storage medium of claim 15, wherein causing the controller device to exclude the sensor device from being monitored until the radio frequency noise returns to below the noise threshold comprises:
generating a message directed to the controller device, wherein the message instructs the controller device to exclude the sensor device from being monitored by the controller device until the radio frequency noise returns to below the noise threshold; and
sending the message to the controller device.

17. The computer-readable storage medium of claim 16, wherein the operations further comprise:
determining that the radio frequency noise has returned to below the noise threshold; and
causing the controller device to resume monitoring of the sensor device.

18. The computer-readable storage medium of claim 17, wherein causing the controller device to resume monitoring of the sensor device comprises:
generating a further message directed to the controller device, wherein the further message instructs the controller device to resume monitoring of the sensor device; and
sending the further message to the controller device.

19. The computer-readable storage medium of claim 15, wherein the operations further comprise establishing a baseline radio frequency noise floor for the radio environment.

20. The computer-readable storage medium of claim 15, wherein the operations further comprise:
establishing a baseline radio frequency noise floor for the radio environment; and
establishing a further baseline radio frequency noise floor for the radio environment, wherein the baseline radio frequency noise floor and the further baseline radio frequency noise floor are established for different times of day.

* * * * *